United States Patent
Barnhill et al.

(10) Patent No.: US 7,639,307 B2
(45) Date of Patent: Dec. 29, 2009

(54) UP-SAMPLING TELEVISION AUDIO SIGNALS FOR ENCODING

(75) Inventors: Matthew Barnhill, Duluth, GA (US); Matthew Easley, Woodstock, GA (US)

(73) Assignee: THAT Corporation, Milford, MA (US)

( * ) Notice: Subject to any disclaimer, the term of this patent is extended or adjusted under 35 U.S.C. 154(b) by 729 days.

(21) Appl. No.: 11/196,133

(22) Filed: Aug. 3, 2005

(65) Prior Publication Data

US 2006/0038919 A1  Feb. 23, 2006

Related U.S. Application Data

(60) Provisional application No. 60/598,303, filed on Aug. 3, 2004.

(51) Int. Cl.
*H04N 7/08* (2006.01)
(52) U.S. Cl. .............................. 348/485; 348/484; 381/2
(58) Field of Classification Search .................. 348/484, 348/485, 483, 481, 480, 738; 381/2–4
See application file for complete search history.

(56) References Cited

U.S. PATENT DOCUMENTS

| | | | |
|---|---|---|---|
| 5,155,743 A * | 10/1992 | Jacobs | 375/247 |
| 5,796,842 A | 8/1998 | Hanna | |
| 6,037,993 A | 3/2000 | Easley | |
| 6,118,879 A | 9/2000 | Hanna | |
| 6,192,086 B1 | 2/2001 | Darr | |
| 6,259,482 B1 | 7/2001 | Easley et al. | |
| 6,588,867 B1 | 7/2003 | Darr | |
| 7,180,435 B2 * | 2/2007 | Chen | 341/61 |
| 7,253,753 B2 * | 8/2007 | Wu et al. | 341/61 |

OTHER PUBLICATIONS

Electronic Industries Association, *Multichannel Television Sound*, BTSC System Recommended Practices, EIA Television Systems Bulletin No. 5. Jul. 1985, 316 pp.
PCT International Search Report for related PCT Application No. PCT/US05/27434, 3 pages.
PCT Written Opinion of the International Searching Authority for related PCT Application No. PCT/US05/27434, 3 pages.

* cited by examiner

*Primary Examiner*—M. Lee
(74) *Attorney, Agent, or Firm*—McDermott Will & Emery LLP

(57) ABSTRACT

A television audio signal encoder includes an up-sampler that inserts additional samples into a sum signal, a difference signal, and/or a secondary audio program signal to increase the sample rate of the corresponding signal or signals. The sum signal represents the sum of a left channel digital audio signal and a right channel digital audio signal and the difference signal represents the difference between the left and right audio signals.

18 Claims, 4 Drawing Sheets

UP-SAMPLING TELEVISION AUDIO SIGNALS FOR ENCODING

RELATED APPLICATION AND TECHNICAL FIELD

This application is related to the following U.S. application, of common assignee, from which priority is claimed, and the contents of which are incorporated herein in their entirety by reference: "Digital Interpolating BTSC Stereo Encoder with SAP," U.S. Provisional Patent Application Ser. No. 60/598,303, filed Aug. 3, 2004.

This disclosure relates to processing television audio signals and, more particularly, to encoding television audio signals for transmission.

BACKGROUND

In 1984, the United States, under the auspices of the Federal Communications Commission, adopted a standard for the transmission and reception of stereo audio for television. This standard is codified in the FCC's Bulletin OET-60, and is often called the BTSC (after the committee which proposed it) system, or the MTS (Multi-channel Television Sound) system.

Prior to the BTSC system, broadcast television audio was monophonic, consisting of a single "channel" or signal of audio. Stereo audio requires the transmission of two independent audio channels, and receivers capable of detecting and accurately recovering both of these channels. In order to meet the FCC's requirement that the transmission standard be 'compatible' with existing monophonic television sets (meaning, in other words, that mono receivers be capable of reproducing an appropriate monophonic audio signal from the new type of stereo broadcast), the BTSC committee adopted an approach which had worked for the FM radio world: the stereo Left and Right audio signals are combined to form two new signals, the Sum signal and the Difference signal, which are then modulated for broadcast.

Monophonic television receivers detect and demodulate only the Sum signal, consisting of the addition of the Left and Right stereo signals. Stereo-capable receivers detect and demodulate both the Sum and the Difference signals, recombining them to extract the original stereo Left and Right signals.

For transmission, the Sum signal directly modulates the aural FM carrier just as would a monophonic audio signal. The Difference channel, however, is first modulated onto an AM subcarrier located 31.768 kHz above the aural carrier's center frequency. The nature of FM modulation is such that background noise increases by 3 dB per octave, and as a result, because the new subcarrier is located further from the aural carrier's center frequency than the Sum or mono signal, additional noise is introduced into the Difference channel, and hence into the recovered stereo signal. In many circumstances, in fact, this rising noise characteristic renders the stereo signal too noisy to meet the requirements imposed by the FCC, and so the BTSC system mandates a noise reduction system in the Difference channel signal path.

This system, sometimes referred to as dbx-TV noise reduction (named after the company that developed the system) is of the companding type, comprising an encoder and decoder. The encoder adaptively filters the Difference signal prior to transmission so that its amplitude and frequency content will, upon decoding, appropriately hide ("mask") noise picked up during the transmission process. The decoder completes the process by restoring the Difference signal to its original form and in so doing ensures that noise is audibly masked by the signal content.

The BTSC system also defines a Secondary Audio Programming (SAP) signal, an additional monophonic information channel often used to carry programming in an alternative language, reading services for the blind, or other services. The SAP channel is also susceptible to added noise during broadcast, and so the dbx-TV noise reduction system is used to encode and decode the SAP channel, as well as the aforementioned stereo signals.

The BTSC system is designed to provide audio signals of reasonably high fidelity, and as such its performance can be quantified with those parameters traditionally used to measure the quality of audio delivery systems. In particular, stereo separation is of prime importance, given that the delivery of stereo audio is the main reason for the development of the BTSC system.

As noted earlier, in order to maintain backwards compatibility with existing monophonic TV signals the BTSC system actually broadcasts a Sum signal and a Difference signal, each derived from the original Left and Right audio signals. At the receiver, the Sum and Difference signals are recombined to recover and reproduce the Left and Right signals. Accurate recovery by the receiver, and particularly recovery with good stereo separation, occurs if the various filters in both the broadcast and receiving equipment—especially those that comprise the dbx-TV encoder and decoder—comply closely with the ideal transfer functions defined in OET-60, the BTSC standards document. Inaccuracies in these filters result not just in poor stereo separation, but in degradation of other important audio parameters including frequency response, distortion, and dynamic amplitude accuracy.

The quality of the recovered SAP signal, too, is dependent on the accuracy of the various filters defined by the BTSC standard, again especially those within the dbx-TV encoder and decoder. Since the SAP signal is monophonic, stereo separation is not an issue, of course. However, other audio characteristics will degrade as a result of filter inaccuracies, just as they will with respect to the stereo Left and Right signals.

The BTSC standard defines all of the critical filters in terms of their analog filter transfer functions. While it is generally possible to design a digital filter so that either the magnitude or phase response of the digital filter matches that of an analog filter, as is well known matching both the amplitude and phase responses simultaneously can require prohibitively complex (and expensive) filter topologies.

With no compensating filters, the audio performance of the recovered signal may suffer dramatically. Thus, heretofore, the alternative has been to use simpler digital filters and either accept the reduced audio performance or add additional compensatory networks, usually in the form of all-pass filters, to attempt to correct at least some of the inevitable phase inaccuracies. In the latter case, the compensatory networks add complexity and cost. Further, because certain critical filters used in the dbx-TV encoder and decoder are dynamic in nature with transfer functions that change from moment to moment depending on signal content, fixed compensation networks are necessarily a compromise, and do not adequately track the filter errors as the various signals change over time.

SUMMARY OF THE DISCLOSURE

In accordance with an aspect of the disclosure, a television audio signal encoder includes an up-sampler that inserts additional samples into a sum signal to increase the sample rate of the sum signal. The sum signal represents the sum of a left channel digital audio signal and a right channel digital audio signal.

In one embodiment, the television audio signal encoder further includes another up-sampler that inserts additional samples into a difference signal to increase the sample rate of the difference signal. The difference signal represents the subtraction of one of the left from the right digital audio signal or the right from the left digital audio signal from the other. The encoder may also include a matrix that sums the left channel digital audio signal and the right channel digital audio signal to produce the sum signal. The matrix may also subtract the left and right audio signals from each other to produce the difference signal. A digital filter may also be included in the encoder for receiving the up-sampled sum signal. The increased sample rate may be selected based on characteristics of the digital filter. The encoder may also include a compressor that receives the up-sampled difference signal in which the increased sample rate is selected based on characteristics of the compressor. The television audio signals may comply with various television standards such as the Broadcast Television System Committee (BTSC) standard, the A2/Zweiton standard, the EIA-J standard, or other similar standard.

In accordance with another aspect of the disclosure, a television audio signal encoder includes an up-sampler that inserts additional samples into a difference signal to increase the sample rate of the difference signal. The difference signal represents the subtraction of one of the left channel digital audio signal from a right channel digital audio signal from the other.

In one embodiment, the television audio signal encoder may also include another up-sampler that inserts additional samples into a sum signal to increase the sample rate of the sum signal. The sum signal may represent the sum of the left channel digital audio signal and the right channel digital audio signal. The television audio signal encoder may also include a compressor that receives the up-sampled difference signal in which the increased sample rate may be selected based on characteristics of the compressor.

In accordance with another aspect of the disclosure, a television audio signal encoder includes an up-sampler that inserts additional samples into a secondary audio program signal to increase the sample rate of the secondary audio program signal.

In one embodiment, the television audio signal encoder may also include another up-sampler that may insert additional samples in a compressed version of the secondary audio program signal to increase the sample rate of the compressed secondary audio program signal.

In accordance with another aspect of the disclosure, a television audio signal encoder includes a summer that sums a signal associated with the sum of a left channel digital audio signal and a right channel digital audio signal and a signal associated with the difference between the left and right digital audio signals. The encoder also includes an up-sampler that inserts additional samples into an output signal of the summer to increase the sample rate of the output signal.

In one embodiment of the television audio signal encoder, the signal associated with the difference between the left and right digital audio signals may be amplitude modulated.

In accordance with another aspect of the disclosure, a television audio signal encoder includes a summer that sums: a signal associated with the sum of a left channel digital audio signal and a right channel digital audio signal and associated with the difference between the left and right digital audio signals, and a signal associated with a secondary audio program channel. The encoder also includes an up-sampler that inserts additional samples into an output signal of the summer to increase the sample rate associated with the signals input into the summer.

In one embodiment of the television audio signal encoder, the signal associated with the secondary audio program channel may be frequency modulated. Also, the up-sampled output signal of the summer may be coupled to a transmitter. The television audio signal encoder may also include another up-sampler that may insert additional samples into an output signal of the first up-sampler to increase the sample rate associated with the output signal of the summer.

In accordance with another aspect of the disclosure, a computer program product residing on a computer readable medium includes instructions that when executed by a processor, cause that processor to insert additional samples into a signal associated with a secondary audio program channel to increase the sample rate of the secondary audio program signal.

In one embodiment, the computer program product may include further instructions to insert additional samples into a sum signal to increase the sample rate of the sum signal. The sum signal may represent the sum of a television left channel digital audio signal and a television right channel digital audio signal. Still further instructions may be included to insert additional samples into a difference signal to increase the sample rate of the difference signal. The difference signal may represent the subtraction of one of a television left channel digital audio signal and a television right channel digital audio signal from the other. Additional instructions may be included to insert additional samples into an output signal of a summer that sums a signal associated with the sum a television left channel digital audio signal and a television right channel digital audio signal and a signal associated with the difference between the left and right digital audio signals. Even more instructions may be included to insert additional samples into an output signal of a summer that sums: a signal associated with the sum of a television left channel digital audio signal and a television right channel digital audio signal and associated with the difference between the left and right digital audio signals, and a signal associated with the secondary audio program channel.

In accordance with another aspect of the disclosure, a computer program product residing on a computer readable medium includes instructions that when executed by a processor, cause that processor insert additional samples into a sum signal to increase the sample rate of the sum signal. The sum signal represents the sum of a television left channel digital audio signal and a television right channel digital audio signal.

In one embodiment, the computer program product may include further instructions to insert additional samples into a signal associated with a secondary audio program channel to increase the sample rate of the secondary audio program signal. The computer product may also include instructions to insert additional samples into a difference signal to increase the sample rate of the difference signal. The difference signal represents the subtraction of one of the television left channel digital audio signal and the television right channel digital audio signal from the other.

In accordance with another aspect of the disclosure, a method of encoding television audio signals includes inserting additional samples into a signal associated with a secondary audio program channel to increase the sample rate of the secondary audio program signal.

In one embodiment, the method may further include inserting additional samples into a sum signal to increase the sample rate of the sum signal. The sum signal may represent the sum of a left channel digital audio signal and a right channel digital audio signal. The method may also include inserting additional samples into a difference signal to increase the sample rate of the difference signal. The difference signal may represent the subtraction of one of a left channel digital audio signal and a right channel digital audio signal from the other. The method may also include inserting additional samples into an output signal of a summer that sums a signal associated with the sum a left channel digital audio signal and a right channel digital audio signal and a signal associated with the difference between the left and right digital audio signals. The method may also include inserting additional samples into an output signal of a summer that sums: a signal associated with the sum a left channel digital audio signal and a right channel digital audio signal and associated with the difference between the left and right digital audio signals, and a signal associated with the secondary audio program channel.

In accordance with another aspect of the disclosure, a method of encoding television audio signals includes inserting additional samples into a sum signal to increase the sample rate of the sum signal. The sum signal represents the sum of a left channel digital audio signal and a right channel digital audio signal.

In one embodiment, the method may further include inserting additional samples into a signal associated with a secondary audio program channel to increase the sample rate of the secondary audio program signal. The method may also include inserting additional samples into a difference signal to increase the sample rate of the difference signal. The difference signal represents the subtraction of one of the left channel digital audio signal and the right channel digital audio signal from the other.

Additional advantages and aspects of the present disclosure will become readily apparent to those skilled in the art from the following detailed description, wherein embodiments of the present invention are shown and described, simply by way of illustration of the best mode contemplated for practicing the present invention. As will be described, the present disclosure is capable of other and different embodiments, and its several details are susceptible of modification in various obvious respects, all without departing from the spirit of the present disclosure. Accordingly, the drawings and description are to be regarded as illustrative in nature, and not as limitative.

DETAILED DESCRIPTION OF THE EMBODIMENTS

Figure 1:
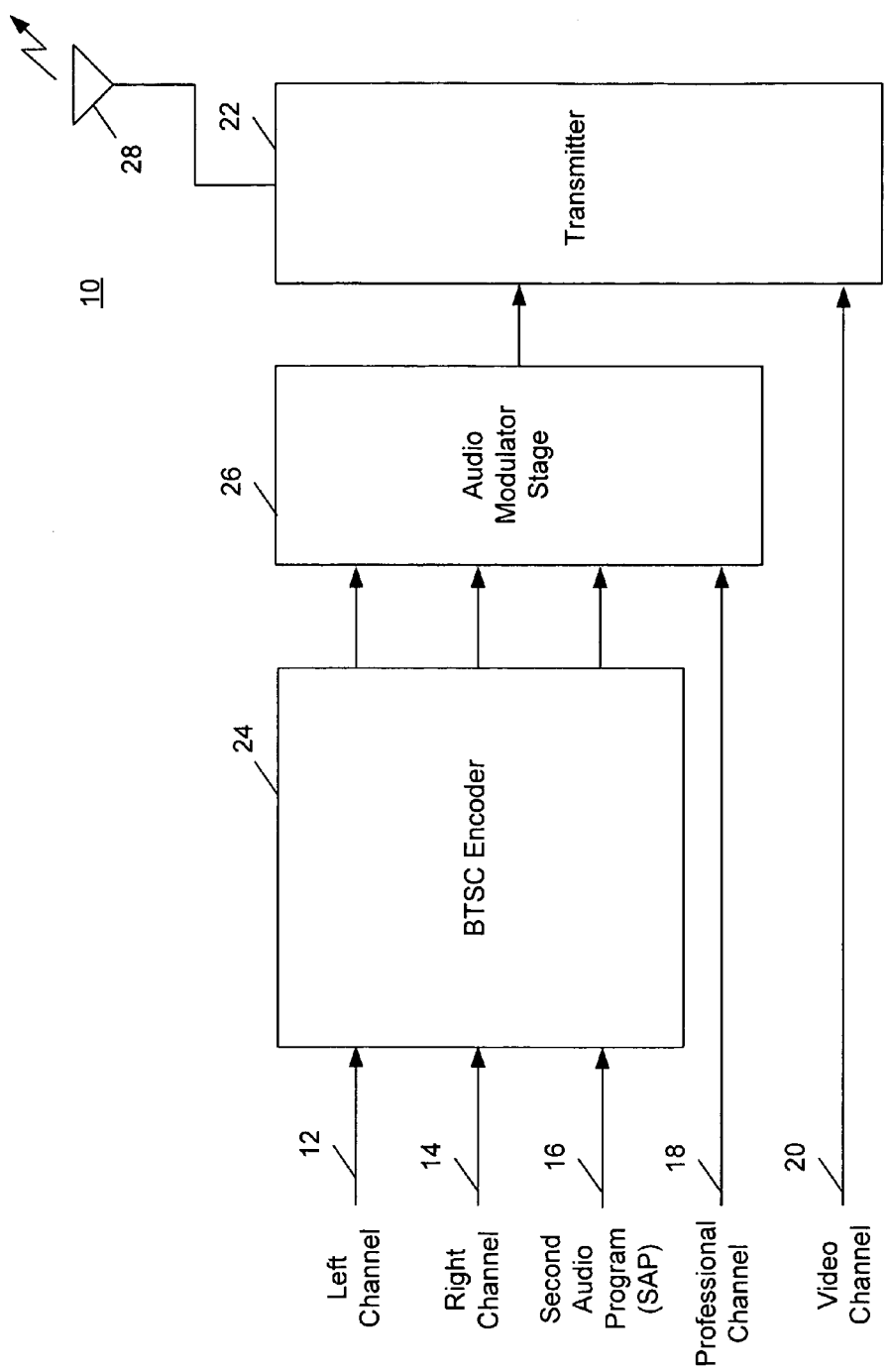
FIG. 1 is a block diagram representing a television signal transmission system that is configured to comply with the BTSC television audio signal standard.

Referring to FIG. 1, a functional block diagram of a BTSC compatible television signal transmitter 10 is presented that processes audio and video content of a television signal for transmission to one or more reception sites. In this exemplary design, left and right audio channels are provided on respective lines (e.g., conductive wires, cables, buses, etc.) 12 and 14. A secondary audio program (SAP) signal that includes additional channel information content (e.g., alternative languages, either as audio signals or subtitles for video viewing, etc.) is provided by a line 16. A fourth line 18 provides a professional channel that is typically used by broadcast television and cable television companies. In this exemplary design, the audio signals are over these lines are digitized. Similarly, the signal contents from the professional channel may be digital, or alternatively analog. To transmit video content, video channel signals are provided by a line 20 to a transmitter 22.

Digital signals from the left, right, and SAP channels are provided to a BTSC encoder 24, which in turn prepares the audio signals for transmission. As mentioned above, sum and difference signals are produced from the left and right channel signals by BTSC encoder 24. Additionally, signals from the SAP channel are processed by BTSC encoder 24. An audio modulator stage 26 receives the processed sum signal, difference signal, and SAP signal and prepares the signals for transmission. Additionally, signals from the professional channel are prepared for transmission by audio modulator stage 26. In this exemplary design, audio modulator stage 26 combines and provides the four signals to transmitter 22 that receives the video signals provided by line 20. Along with the video signals, the four audio signals are preferably conditioned for transmission and provided, for example, to an antenna (or an antenna system) 28, when the latter is needed for transmitting the signal. Various signal transmitting techniques known to one skilled in the art of television systems and telecommunications may be implemented by transmitter 22 and when needed antenna 28. For example, transmitter 22 may be incorporated into a cable television system (where an antenna is not needed), a broadcast television system, or other similar television audio and video content generation system.

Figure 2:
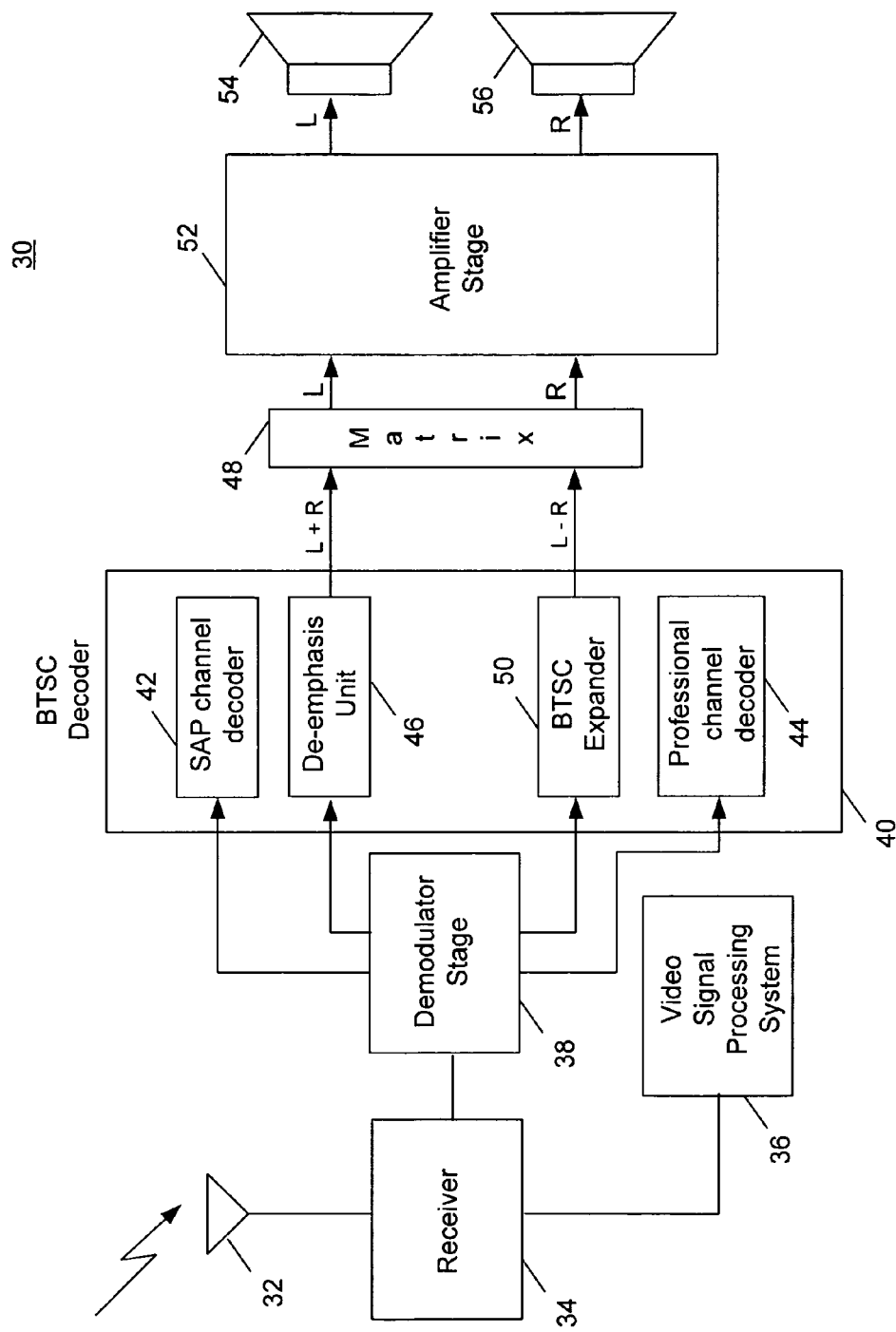
FIG. 2 is a block diagram representing a television receiver system that is configured to receive and decode BTSC television audio signals sent by the television signal transmission system shown in FIG. 1.

Referring to FIG. 2, a block diagram is shown that represents a television receiver system 30 that includes an antenna 32 (or a system of antennas), if necessary, for receiving BTSC compatible broadcast signals from television transmission systems such as system 10 (shown in FIG. 1). The received signals are preferably provided to a receiver 34, the latter being capable of detecting and isolating the television transmission signals. However, in some arrangements receiver 34 may receive the BTSC compatible signals from another television signal transmission technique known to one skilled in the art of television signal broadcasting. For example, the television signals may be provided to receiver 34 over a cable television system or a satellite television network.

Upon receiving the television signals, receiver 34 conditions (e.g., amplifies, filters, frequency scales, etc.) the signals and separates the video signals and the audio signals from the transmission signals. The video content is preferably provided to a video processing system 36 that prepares the video content contained in the video signals for presentation on a screen (e.g., a cathode ray tube, etc.) associated with the television receiver system 30. Signals containing the separate audio content are preferably provided to a demodulator stage 38 that e.g., removes the modulation applied to the audio signals by television transmission system 10. The demodulated audio signals (e.g., the SAP channel signal, the professional channel signal, the sum signal, the difference signal) are preferably provided to a BTSC decoder 40 that appropriately decodes each signal. The SAP channel signal is preferably provided a SAP channel decoder 42 and the professional channel signal is preferably provided to a professional channel decoder 44. Along with separating the SAP channel and the professional channel, a demodulated sum signal (i.e., L+R signal) is preferably provided to a de-emphasis unit 46 that processes the sum signal in a substantially complementary fashion to the processing by BTSC encoder 24 (shown in FIG. 1). Upon de-emphasizing the spectral content of the sum signal, the signal is preferably provided to a matrix 48 for separating the left and right channel audio signals.

The difference signal (i.e., L−R) is also demodulated by demodulation stage 38 and is preferably provided to a BTSC expander 50 that is included in BTSC decoder 40. BTSC expander 50 complies with the BTSC standard to condition the difference signal. Matrix 48 receives the difference signal from BTSC expander 50 and with the sum signal, separates the right and left audio channels into independent signals (identified in the figure as "L" and "R"). By separating the signals, the individual right and left channel audio signals may be conditioned and provided to separate speakers. In this example, both the left and right audio channels are provided to an amplifier stage 52 that applies the same (or different) gains to each channel prior to providing the appropriate signals to a speaker 54 for broadcasting the left channel audio content and another speaker 56 for broadcasting the right channel audio content.

As mentioned above, the audio signals (e.g., left channel, right channel, SAP channel) are preferably digitized prior to being encoded for transmission. In such a digital implementation, digital filters such as finite impulse response (FIR) filters or infinite impulse response (IIR) filters are extensively used to encode and decode the digital audio signals prior to transmission and after reception. Accurate recovery of the L and R signals by the receiver system, particularly recovery with good stereo separation, may occur if the various filters in both the broadcast and receiving equipment—especially those that comprise the BTSC encoder and decoder—comply with the ideal transfer functions defined in the BTSC standards document (OET-60). Inaccuracies in these filters may not result in poor stereo separation, but may cause degradation of other important audio parameters including frequency response, distortion, and dynamic amplitude accuracy.

The quality of the recovered SAP signal, too, is dependent on the accuracy of the various filters defined in the BTSC standard, again especially those within the BTSC encoder and decoder. Since the SAP signal is monophonic, stereo separation is not an issue. However, other audio characteristics may degrade as a result of filter inaccuracies, similar to the stereo L and R signals degradation.

The BTSC standard defines many (if not all) of the critical filters in terms of analog filter transfer functions. As is well known in the art, while it is generally possible to design a digital filter so that either the magnitude or phase response of the digital filter matches that of an analog filter, matching both the amplitude and phase responses simultaneously may call for prohibitively complex (and expensive) filter topologies, adding to the size, cost, and power consumption of the resulting circuitry.

To avoid the need of such complex filters, the digital audio signals may be pre-processed such that relatively simple filter implementations perform similar to the ideal transfer functions as described in the BTSC standards document (OET-60). For example, by inserting additional samples into one or more of the digital audio signals and increasing the sample rate correspondingly, the magnitude and phase of the filters over the frequency band of interest may provide a better match to the ideal transfer functions. Furthermore, by inserting additional samples into a digital audio signal and thereby increasing the sample rate correspondingly (known in the art as up-sampling), the resulting signal may provide a better match for other types of components. For example, by increasing the sample rate, a digital audio signal may better match the input characteristics of a digital-to-analog converter (DAC), a digital modulator, or other component or stage included in a television transmission or reception system.

Figure 3:
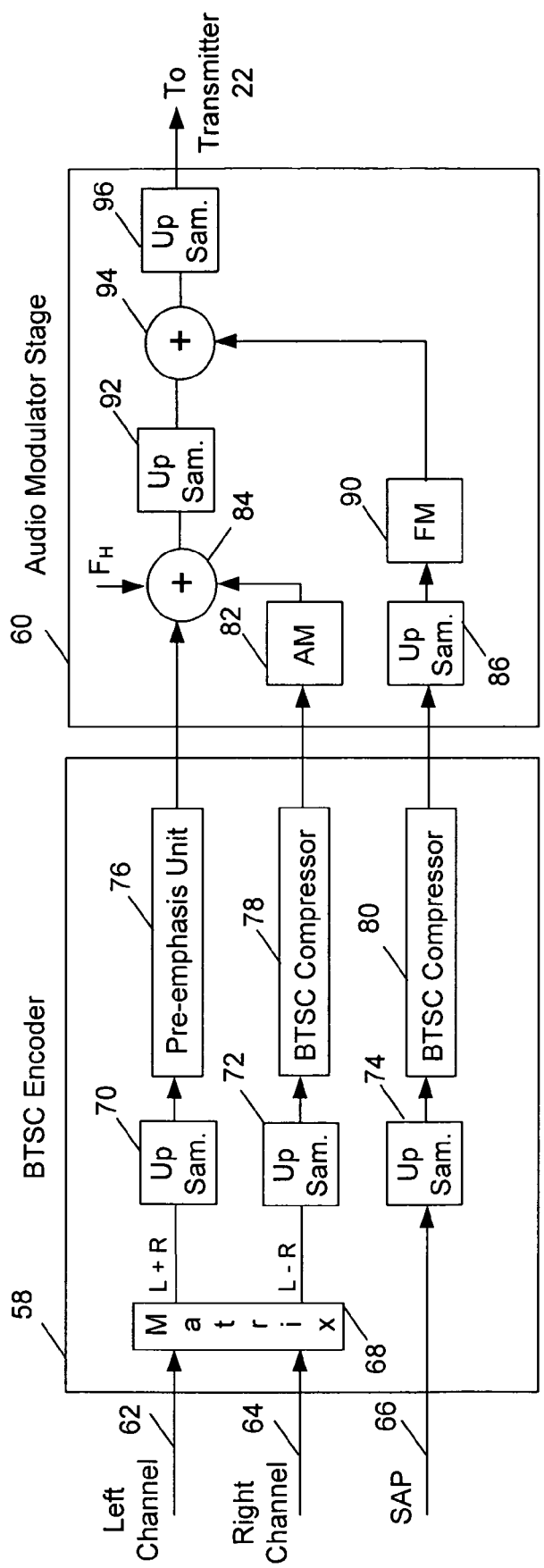
FIG. 3 is a block diagram representing a portion of the television signal transmission system shown in FIG. 1 that up-samples audio signals for encoding and modulating prior to transmission according to the teaching herein.

Referring to FIG. 3, portions of an exemplary BTSC encoder 58 and an audio modulator stage 60 process digital audio signals to provide signals with appropriate sample rates to potentially achieve the ideal transfer functions described in the BTSC standards document (OET-60). Digitized audio signals from a left, right, and SAP channel are preferably provided over respective lines 62, 64, and 66 to BTSC encoder 58. Specifically, signals from the left and right audio channels are preferably provided to a matrix 68 that calculates a sum signal (e.g., L+R) and a difference signal (e.g., L−R) from the digital audio signals. Typically operations of matrix 68 are performed by utilizing a digital signal processor (DSP) or similar hardware techniques known to one skilled in the art of television audio and video signal processing. Alternatively, the operations of matrix 68 may be partially or completely implemented with software techniques known to one skilled in the art. Once produced, sum and difference signals (i.e., L+R and L−R) are encoded for transmission.

Since filtering within BTSC encoder 58 and audio modulator stage 60 provided by digital filters, transfer functions that represent analog filter implementations are converted from the s-plane (Laplace domain) to the z-plane (discrete domain). This transformation, known as a bilinear transformation is described in U.S. Pat. No. 6,037,993 that is incorporated by reference herein. To substantially match the performance of the analog implementations, the magnitude and phase responses of the digital implementations preferably approximately match the ideal responses provided by the OET-60 standard document. To provide this match, the digital audio signals are up-sampled to increase the sample rate of each digital audio signal. As mentioned above, up-sampling is performed by inserting additional samples into a digital signal. Various types of up-sampling techniques known to one skilled in the art of digital signal processing may be employed. For example, zero-value samples may be interwoven between existing sample pairs of the digital audio signals and the resulting signal passed through a low-pass filter. Interpolation techniques may also be implemented. For example, one or more additional samples may be determined by interpolating a data point (or data points) between each existing pair of samples e.g., using polynomial or other similar estimation techniques. Once determined, the additional sample (or samples) may be inserted between the appropriate sample pair in the digital audio signal.

In this exemplary design, the sum, difference, and SAP digital audio signals are up-sampled by respective up-samplers 70, 72, and 74 to insert additional samples into each digital signal. In one scenario, each of the digital audio signals may be initially sampled at a rate of 48 KHz. To improve filter magnitude and phase matching, up-samplers 70-74 may increase the sample rate by a factor of four to 192 KHz. This increase provides improved digital filter matching to the ideal continuous time characteristics described in "Multichannel Television Sound" BTSC System Recommended Practices from the Electronic Industries Association (EIA Television Systems Bulletin No. 5, July 1985) that is incorporated by reference herein.

The up-sampled sum signal (i.e., L+R) is preferably provided to a pre-emphasis unit 76 that alters the magnitude of select frequency components of the sum signal with respect to other frequency components. The alteration may be in a negative sense in which the magnitudes of the select frequency components are suppressed, or the alteration may be in a positive sense in which the magnitudes of the select frequency components are enhanced.

The up-sampled difference signal (i.e., L−R) is preferably provided to a BTSC compressor 78 that adaptively filters the signal prior to transmission such that when decoded, the signal amplitude and frequency content suppress noise imposed during transmission. BTSC compressor 78 essentially generates the encoded difference signal by dynamically compressing, or reducing the dynamic range of the difference signal so that the encoded signal may be transmitted through a limited dynamic range transmission path, and so that a decoder receiving the encoded signal may recover substantially all the dynamic range in the original difference signal by expanding the compressed difference signal in a complementary fashion. In some arrangements, BTSC compressor 78 is a particular form of the adaptive signal weighing system described in U.S. Pat. No. 4,539,526, incorporated by reference herein, and which is known to be advantageous for transmitting a signal having a relatively large dynamic range through a transmission path or medium having a relatively narrow, frequency dependent, dynamic range. Similar to the up-sampled difference signal, the up-sampled SAP signal is preferably provided to a BTSC compressor 80. The BTSC standard rigorously defines the desired operation of pre-emphasis unit 76 and BTSC compressors 78 and 80. Specifically, the BTSC standard provides transfer functions and/or guidelines for the operation of each component included e.g., in BTSC compressor 78 and the transfer functions are described in terms of mathematical representations of idealized analog filters. These characteristics of BTSC compressors 78 and 80 (and associated components) may be used to define the up-sampling of their input signals. After processing by pre-emphasis unit 76 and BTSC compressors 78 and 80, the up-sampled signals are preferably provided to audio modulator stage 60 for combining prior to transmission.

Audio modulator stage 60 receives the processed up-sampled sum signal, difference signal, and SAP signal. Additionally, in some arrangements (not shown here), signals from the professional channel are also preferably provided to audio modulator stage 60. In this example, the up-sampled sum signal is received by audio modulator stage 60 and is summed with the up-sampled difference signal. Prior to summing, the difference signal is preferably provided to an amplitude modulator 82 that amplitude modulates the difference signal. For example, the difference signal may be modulated upon a carrier waveform with a frequency that is twice the video horizontal synchronization frequency, $F_H$, (e.g., 2*15.734 KHz) that is used by transmission system 10. The amplitude modulated difference signal is preferably provided to a summer 84 that sums this signal with the sum signal from BTSC encoder 58. Summer 84 also sums these two signals with a signal that has a frequency that is equivalent the video horizontal synchronization frequency ($F_H$) used by the system. To identify the output signal of summer 84, the output signal is referred to as a composite signal.

Audio modulator stage 60 also receives the up-sampled SAP signal from BTSC compressor 80. Audio modulator stage 60 then up-samples (inserts additional samples) the signal to a higher sample rate to prepare the signal for frequency modulating. In some arrangements, up-sampler 86 may up-sample the signal by a factor of two to provide a sample rate of 384 KHz. This up-sampled SAP signal has the appropriate sample rate for a frequency modulator 90 that frequency modulates a carrier signal with the up-sampled SAP signal. For example, a carrier signal with a center frequency of five times $F_H$ (5×15.734 KHz) may be frequency modulated by the up-sampled SAP signal. In some arrangements, this frequency modulation may be limited to a maximum deviation of 10 KHz. Once frequency modulated, the output signal of frequency modulator 90 is combined with a version of the composite signal produced by summer 84.

Prior to combining the composite signal (i.e., the combined up-sampled sum and difference signal) output from summer 84, the composite signal is up-sampled by an up-sampler 92. In this example, up-sampler 92 increases the sample rate of the composite signal by a factor of two. Continuing with this example, the sample rate of the composite signal is increased from 192 KHz to a sample rate of 384 KHz. By increasing the sample rate of the composite signal, the signal may be directly summed with the frequency modulated SAP signal that is output from frequency modulator 90. In this exemplary design, a summer 94 sums the up-sampled composite signal from up-sampler 92 and the frequency modulated SAP signal output by frequency modulator 90.

Although absent in this arrangement, another portion of audio modulator stage 60 also may appropriately modulate signals that are provided from the professional channel. In some arrangements these professional channel signals are combined with the other signals (e.g., the sum signals (L+R), the difference signals (L−R), and the SAP signals) prior to transmission. Alternatively, signals from the professional channel may be transmitted separate from the other signals by using one or more methodologies known to one skilled in the art of signal transmission and reception.

Prior to sending the output signal from summer 94 (i.e., the composite signal of the sum signal (L+R), the difference signal (L−R), and the SAP signal) to transmitter 22, the signal may be further up-sampled to provide an appropriate composite signal to one or more components in the transmitter. For example, transmitter 22 may include a digital-to-analog converter (DAC) that operates with relatively few bits of resolution and at relatively high sample rates. As is well known in the art, particular signal-to-noise ratios may be achieved and maintained with fewer bits of resolution if the DAC operates with an increased sample rate. In order to improve the signal-to-noise ratio, the frequency bandwidth of the signal needs to remain substantially equivalent independent of this increase in sample rate. In this example, to provide a increased sample rate to a DAC included in transmitter 22, up-sampler 96 increases the sample rate by up-sampling the output signal of summer 94. Up-sampler 96 may increase the sample rate to e.g., 3 MHz to match the sample rate needed by the DAC. Along with up-sampling the output signal of summer 94, noise shaping techniques (e.g., sigma-delta, etc.) may be implemented in combination with (or separate from) up-sampling to improve signal-to-noise ratios.

By inserting additional samples into the output signal of summer 94, up-sampler 96 preferably provides a composite digital signal (that includes the digital audio signals) to a low resolution DAC in transmitter 22. For example, inexpensive DACs that have ten to twelve bits of resolution and operate with relatively high sample rates (e.g., larger than 192 KHz) may be used by the transmitter. Also, considerable amounts of low-resolution, high sample rate DACs (for video applications) are available on the application specific integrated circuit (ASIC) market. Additionally, by utilizing a high sample rate DACs, post conversion filtering is improved since additional spectral content (multiple frequency octaves) is preserved. Along with up-sampling the output of summer 94 to prepare the digital audio signals for one or more DACs included in transmitter 22, additional processing may be performed for other types of components and portions of a transmitter.

Figure 4:
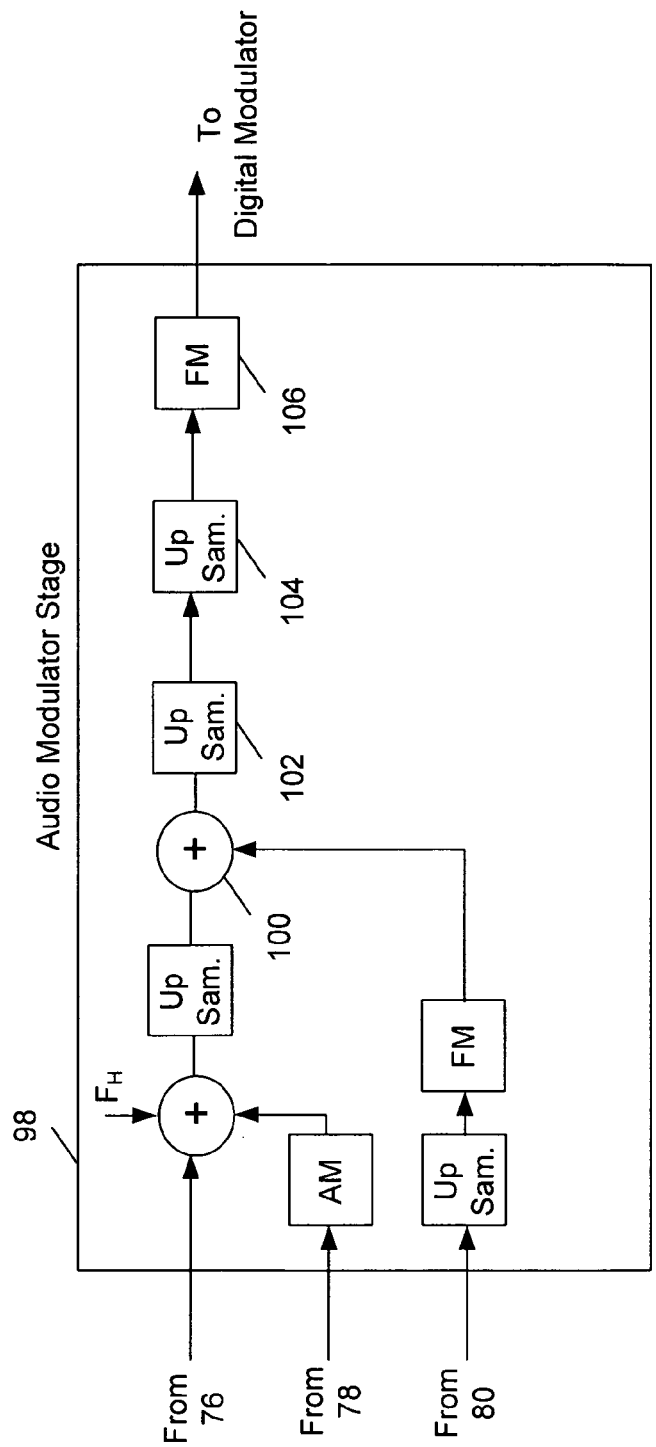
FIG. 4 is a block diagram representing a portion of the television signal transmission system shown in FIG. 1 that up-samples audio signals for digital modulating the signals prior to transmission according to the teaching herein.

Referring to FIG. 4, a portion of an exemplary audio modulator stage 98 is shown and is preferably provided the same signals from BTSC encoder 58 as audio modulator stage 60. Similar to stage 60, audio modulator stage 98 preferably includes up-samplers and summers to increase the sample rate of sum signal (L+R), the difference signal (L−R), the SAP signal, and the corresponding composite signal produced by the summers. By increasing the sample rates, digital signals that contain the appropriate magnitude and phase content are preferably provided for digital filtering and other processing functions such as digital-to-analog conversion. Up-sampling may also prepare a composite digital audio signal (e.g., that includes the sum, difference, and SAP channel signals) for a digital modulator that processes the composite signal for transmission. For example, transmitter 22 may include a digital modulator that efficiently operates if provided a frequency modulated aural signal (i.e., the portion of a television channel signal that includes the audio information) with a center frequency of 4.5 MHz.

To provide an appropriate composite signal to the digital modulator, audio modulate stage 98 preferably processes the signals from BTSC encoder 58 in a similar manner. Appropriate signals are up-sampled and modulated (similar to audio modulator stage 60). The appropriate signals are then combined into a composite signal by a summer 100 (similar to summer 94 shown in FIG. 3). The composite output signal from summer 100 is preferably provided to an up-sampler 102 that increases the sample rate of the signal by inserting additional samples into the digital signal. As mentioned above, these inserted samples may be determined by interpolating the existing signal samples or by inserting other sample values (e.g., zero value samples), or other similar methodology known in the art. In this exemplary design, up-sampler 102 increases the sample rate to 3 MHz (similar to up-sampler 96 shown in FIG. 3). To prepare the composite digital audio signal for the digital modulator, the up-sampled output of up-sampler 102 is preferably provided to another up-sampler 104 to further increase the signal sample rate. In this particular example, up-sampler 104 increases the sample rate (e.g., to 10 MHz) as dictated by the characteristics (e.g., resolution, bandwidth, etc.) of the digital modulator included in the transmitter. After increasing the sample rate to an appropriate amount, the composite signal is preferably provided to a frequency modulator 106 that frequency modulates an aural carrier of 4.5 MHz with the composite signal.

As is known to one skilled in the art of signal processing, various interpolation schemes may be implemented in the BTSC encoders and audio modulator stages described above. For example, the audio signals may be initially sampled at 192 KHz, thereby eliminating the need for up-samplers 70, 72, and 74 (shown in FIG. 3). Alternatively, an initial sampling rate of 384 KHz further reduces the need for some of the other up-samplers. Further, sample rate adjustments may be based on many factors such as: processing bandwidth of implementation medium, available input sample rate, power consumption, performance requirements, cost and DAC availability. Additionally, while the above described up-samplers and summer are distributed in BTSC encoders and audio modulator stages, these devices or other similar devices that perform these operations may be distributed in a different manner or located entirely in either an encoder or an audio modulator stage.

In this example, the BTSC encoders and audio modulator stages are implemented with hardware components (and may be manufactured, for example, as a single integrated circuit, and chip set, a hybrid circuit, or a circuit with discrete components), however, in some arrangements one or more operational portions of the BTSC encoders and/or audio modulator stages may be implemented in software or a combination of both. One exemplary listing of code that performs some of the operations of the BTSC encoders and audio modulator stages is presented in appendix A. The exemplary code is preferably provided in Verilog, which, in general, is a hardware description language that is used by electronic designers to describe and design chips and systems prior to fabrication. This code may be stored on and retrieved from a storage device (e.g., RAM, ROM, hard-drive, CD-ROM, etc.) and executed on one or more general purpose processors and/or specialized processors such as a dedicated DSP.

While the previous examples described using encoders and decoders compatible with the BTSC standards, up-sampling digital audio signals may be implemented into encoders and decoders that comply with other television audio standards. For example, encoders and/or decoders designed for standards associated with A2/Zweiton (currently used in parts of Europe and Asia), may incorporate up-sampling to increase sample rates of digital audio signals. Similarly, encoders and decoders implementing standards associated with the Electronics Industry Association of Japan (EIA-J) may implement up-sampling methodologies described above.

A number of implementations have been described. Nevertheless, it will be understood that various modifications may be made. Accordingly, other implementations are within the scope of the following claims.

What is claimed is:

1. A television audio signal encoder, comprising:
   a summer configured to sum a left channel digital audio signal and a right channel digital audio signal to produce a sum signal, and to subtract one of the left and right audio signals from the other of the left and right signals to produce a difference signal;
   a first up-sampler configured to insert additional samples into the sum signal to increase the sample rate of the sum signal, wherein the sum signal represents the sum of a left channel digital audio signal and a right channel digital audio signal;
   a second up-sampler configured to insert additional samples into the output signal of the first up-sampler to increase the sample rate associated with the output signals of the summer.

2. The television audio signal encoder of claim 1, further comprising:
   a digital filter configured to receive the up-sampled sum signal, wherein the increased sample rate is selected based on characteristics of the digital filter.

3. The television audio signal encoder of claim 1, further comprising:
   a compressor configured to receive the up-sampled difference signal, wherein the increased sample rate is selected based on characteristics of the compressor.

4. The television audio signal encoder of claim 1, wherein the television audio signals comply to the Broadcast Television System Committee (BTSC) standard.

5. The television audio signal encoder of claim 1, wherein the television audio signals comply to the A2/Zweiton standard.

6. The television audio signal encoder of claim 1, wherein the television audio signals comply to the EIA-J standard.

7. A television audio signal encoder, comprising:
   a summer configured to sum,
      a signal associated with the sum of a left channel digital audio signal and a right channel digital audio signal and associated with the difference between the left and right digital audio signals, and
      a signal associated with a secondary audio program channel;
   a first up-sampler configured to insert additional samples into an output signal of the summer to increase the sample rate associated with the output signal; and
   a second up-sampler configured to insert additional samples into an output signal of the first up-sampler to increase the sample rate associated with the output signal of the summer.

8. The television audio signal encoder of claim 7, wherein the signal associated with the secondary audio program channel is frequency modulated.

9. The television audio signal encoder of claim 7, further comprising:
   a frequency modulator configured to modulate a signal associated with the output of the first up-sampler.

10. The television audio signal encoder of claim 7, wherein the up-sampled output signal of the summer is provided to a transmitter.

11. The television audio signal encoder of claim 7, further comprising:
    a frequency modulator configured to modulate the output signal of the second up-sampler.

12. A computer program product residing on a computer readable medium having a plurality of instructions stored thereon which, when executed by the processor, cause that processor to:
    insert additional samples into a signal associated with a secondary audio program channel to increase the sample rate of the secondary audio program signal; and
    insert additional samples into an output signal of a summer, wherein the summer is configured to sum,
       a signal associated with the sum a television left channel digital audio signal and a television right channel digital audio signal and associated with the difference between the left and right digital audio signals, and
       a signal associated with the secondary audio program channel.

13. The computer program product of claim 12, further comprising instructions to:
    insert additional samples into a sum signal to increase the sample rate of the sum signal, wherein the sum signal represents the sum of a television left channel digital audio signal and a television right channel digital audio signal.

14. The computer program product of claim 12, further comprising instructions to:
    insert additional samples into a difference signal to increase the sample rate of the difference signal, wherein the difference signal represents the subtraction of one of a television left channel digital audio signal and a television right channel digital audio signal from the other of the left and right digital audio signals.

15. The computer program product of claim 12, further comprising instructions to:
    insert additional samples into an output signal of a summer that is configured to sum a signal associated with the sum a television left channel digital audio signal and a television right channel digital audio signal and a signal associated with the difference between the left and right digital audio signals.

16. A method of encoding television audio signals, comprising:
    with an up-sampler, inserting additional samples into a signal associated with a secondary audio program channel to increase the sample rate of the secondary audio program signal; and
    with an up-sampler, inserting additional samples into an output signal of a summer, wherein the summer is configured to sum,
       a signal associated with the sum of a left channel digital audio signal and a right channel digital audio signal and associated with the difference between the left and right digital audio signals, and
       a signal associated with the secondary audio program channel.

17. A method of claim 16, further comprising:
    with an up-sampler, inserting additional samples into a sum signal to increase the sample rate of the sum signal, wherein the sum signal represents the sum of a left channel digital audio signal and a right channel digital audio signal.

18. The method of claim 16, further comprising:
    with an up-sampler, inserting additional samples into a difference signal to increase the sample rate of the difference signal, wherein the difference signal represents the subtraction one of a left channel digital audio signal and a right channel digital audio signal from the other of the left and right digital audio signals.

* * * * *

UNITED STATES PATENT AND TRADEMARK OFFICE
CERTIFICATE OF CORRECTION

PATENT NO. : 7,639,307 B2  Page 1 of 1
APPLICATION NO. : 11/196133
DATED : December 29, 2009
INVENTOR(S) : Barnhill et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1183 days.

Signed and Sealed this

Ninth Day of November, 2010

David J. Kappos
*Director of the United States Patent and Trademark Office*